Dec. 10, 1935.  V. V. VAUGHN  2,023,451
KITCHEN UTENSIL
Filed May 17, 1934
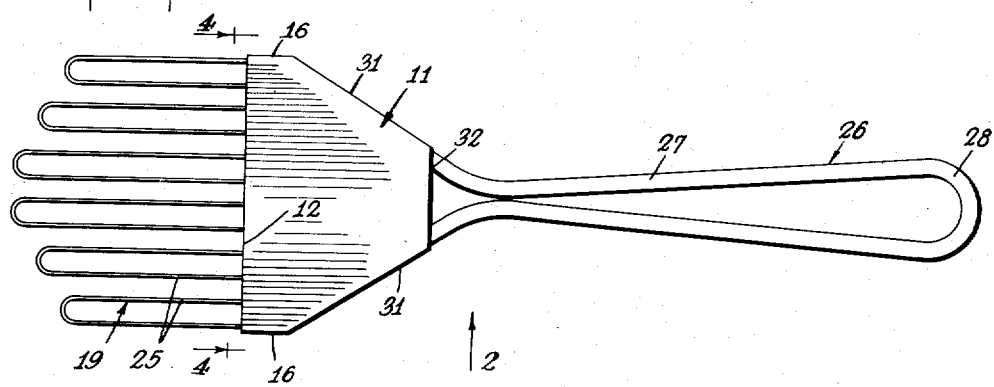
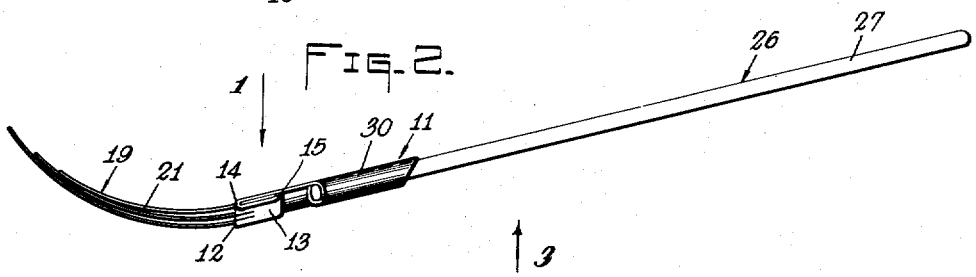
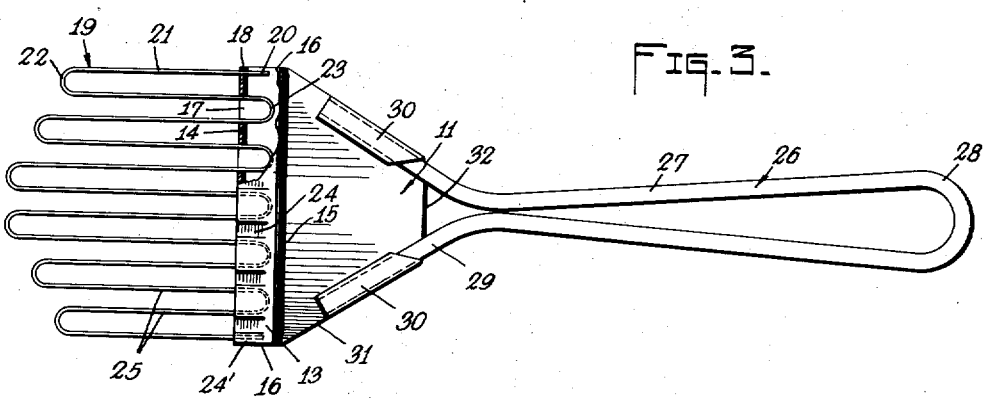
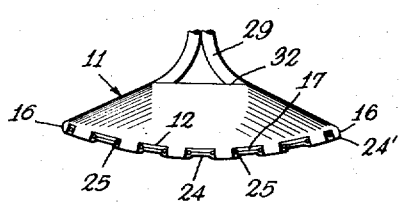
Inventor
V. V. Vaughn
By Hazard and Miller
Attorneys Patented Dec. 10, 1935

2,023,451

UNITED STATES PATENT OFFICE 2,023,451

KITCHEN UTENSIL

Versal Vestal Vaughn, Los Angeles, Calif.

Application May 17, 1934, Serial No. 726,690

2 Claims. (Cl. 259—144)

My invention relates to a type of kitchen utensil which may be used for mashing potatoes, beating eggs or other culinary work, in which a device with tines or finger-like structures is utilized.

An object and feature of my invention is the construction of a kitchen utensil having tines or fingers attached to a supporting plate, which plate has a handle.

A further feature of my invention is forming the tines or fingers somewhat flexible and curved or arched to facilitate the use of the utensil in mashing potatoes, beating eggs, cream, or in mixing dough, or for various purposes.

A particular feature of my invention relates to the manner of attaching the tines or fingers to the supporting plate in which the tines or fingers are made of a continuous wire with long parallel sections having reverse bends at their ends and reverse bends at their inner ends. The inner ends are secured to the supporting plate. This support is made by forming the supporting plate with an outer end having a reverse fold and providing a plurality of slots at this reverse fold through which the reverse bent inner ends of the continuous wire may be inserted. The reversly folded portion of the supporting plate is then crimped to retain the wire forming the tines or fingers firmly attached to the supporting plate.

Another feature of my invention is forming a handle wire with two diverging ends fitted in elongated eyes formed on the marginal edge of the supporting plate. The handle is made of a single stiff wire having a reverse bend at its outer end.

My invention is illustrated in connection with the accompanying drawing, in which:

Fig. 1 is a plan taken in the direction of the arrow 1 of Fig. 2.

Fig. 2 is a side elevation taken in the direction of the arrow 2 of Fig. 1.

Fig. 3 is a reverse or bottom view taken in the direction of the arrow 3 of Fig. 2.

Fig. 4 is a transverse section on the line 4—4 of Fig. 1 in the direction of the arrows.

In constructing my invention I utilize a supporting plate 11 which has a straight end 12 at right angles to the axial center of the plate. This end has a gripping plate end 13 made by a reverse fold 14 of the gripping end. This gripping end has a slightly inwardly pressed edge 15. The plate has parallel side edges 16 parallel to the axial line of the plate. Such plate is provided with a plurality of slots 17 formed at their reverse bend or fold 14, and these being spaced apart. The reverse fold is also provided with two outer perforations 18.

The tines or fingers 19 are formed of a single strip of wire in which its opposite ends 20 are inserted through the perforations 18. The wire is bent to provide a plurality of long parallel sections 21, outer reverse bends 22 and inner reverse bends 23. The reverse bends 23 are inserted through the slots 17 at the reverse bend 14 of the supporting plate. Then the end crimping portion 13 is crimped upwardly at 24. (Note Figs. 3 and 4), thus securely holding the inner reverse bends in place. A single crimp 24' adjacent the outer ends 20 retain such ends in place on the supporting plate. This construction developes a plurality of parallel fingers 25, each finger terminating at the reverse bend 22. The fingers or tines are graduated in length.

The handle 26 is formed of a single piece of wire 27 having a reverse bend 28 on the outer end and two diverging ends 29. These diverging ends are fitted in eyes or beads 30 formed on the converging side edges 31 of the plate 11. This plate has an edge 32 facing the handle parallel to the edge 12. The eyes or beads 30 hold the handle firmly attached to the plate 11.

It will be noted that the tines or fingers 19 are bent upwardly as shown in Fig. 2. The device on account of having the tines formed of spaced apart wires may be readily used a number of culinary purposes such as mashing potatoes, whipping or beating eggs or cream, or mixing dough. The device may also readily be used for lifting poached eggs from a pan. Many other uses of the utensil will be apparent. A characteristic feature of the utensil is that the tines or fingers are more or less flexible and are securely attached to the supporting plate 11.

Various changes may be made in the details of construction without departing from the scope of the invention as defined by the appended claims.

I claim:

1. A utensil having a supporting plate with a handle, said plate being curved concave on its upper surface transverse to the axis of the handle, a gripping plate formed integral with the supporting plate and attached to thereto by a reverse bend, said bend forming a line transverse to the axis of the handle, and the gripping plate thus having the same curvature as the supporting plate and fitting closely contiguous thereto, there being a plurality of slots formed at the reverse bend and single perforations adjacent the marginal edges of the said plates, a continuous wire having reverse outer and inner bends with the sections between the bends parallel, the inner bends being inserted each in a slot and the two ends being inserted in the two end perforations of the reverse bend, the gripping plate being crimped at the portion between the inner reverse bends and at the portion adjacent the perforations to firmly attach the wire at the inner bends and the two ends to the supporting and gripping plate, the parallel sections of the wires extending from each outer bend forming tines, said tines being of different lengths and curved with a concave curve considered in the axial direction of the handle and on their upper side.

2. A utensil as claimed in claim 1, parallel portions of the wire forming adjacent tines at the inner reverse bends being also inserted in each slot whereby the crimp of the gripping plate forms a partial closure of the slot between the said two parallel portions of the wire and the inner reverse bend.

V. V. VAUGHN.

CERTIFICATE OF CORRECTION.

Patent No. 2,023,451. December 10, 1935.

VERSAL VESTAL VAUGHN.

It is hereby certified that the above numbered patent was erroneously issued to the inventor said "Vaughn", whereas said patent should have been issued to Charles A. Rowley, of Los Angeles, California, as assignee of the entire interest in said invention,, as shown by the records of assignments in this office, and that the said Letters Patent should be read with this correction therein that the same may conform to the record of the case in the Patent Office.

Signed and sealed this 3rd day of March, A. D. 1936.

Leslie Frazer
Acting Commissioner of Patents.

(Seal)

outer and inner bends with the sections between the bends parallel, the inner bends being inserted each in a slot and the two ends being inserted in the two end perforations of the reverse bend, the gripping plate being crimped at the portion between the inner reverse bends and at the portion adjacent the perforations to firmly attach the wire at the inner bends and the two ends to the supporting and gripping plate, the parallel sections of the wires extending from each outer bend forming tines, said tines being of different lengths and curved with a concave curve considered in the axial direction of the handle and on their upper side.

2. A utensil as claimed in claim 1, parallel portions of the wire forming adjacent tines at the inner reverse bends being also inserted in each slot whereby the crimp of the gripping plate forms a partial closure of the slot between the said two parallel portions of the wire and the inner reverse bend.

V. V. VAUGHN.

CERTIFICATE OF CORRECTION.

Patent No. 2,023,451.  December 10, 1935.

VERSAL VESTAL VAUGHN.

It is hereby certified that the above numbered patent was erroneously issued to the inventor said "Vaughn", whereas said patent should have been issued to Charles A. Rowley, of Los Angeles, California, as assignee of the entire interest in said invention,, as shown by the records of assignments in this office, and that the said Letters Patent should be read with this correction therein that the same may conform to the record of the case in the Patent Office.

Signed and sealed this 3rd day of March, A. D. 1936.

Leslie Frazer
Acting Commissioner of Patents.

(Seal)